US012665509B2

(12) United States Patent
Wakazono et al.

(10) Patent No.: US 12,665,509 B2
(45) Date of Patent: Jun. 23, 2026

(54) POWER SUPPLY APPARATUS

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Keisuke Wakazono, Yokkaichi (JP); Yuuki Sugisawa, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 216 days.

(21) Appl. No.: 18/560,616

(22) PCT Filed: Jul. 26, 2021

(86) PCT No.: PCT/JP2021/027592
§ 371 (c)(1),
(2) Date: Nov. 13, 2023

(87) PCT Pub. No.: WO2023/007557
PCT Pub. Date: Feb. 2, 2023

(65) Prior Publication Data
US 2024/0258921 A1     Aug. 1, 2024

(51) Int. Cl.
*H02M 3/158* (2006.01)
*H02M 1/00* (2006.01)
*H02M 1/32* (2007.01)

(52) U.S. Cl.
CPC ......... *H02M 3/158* (2013.01); *H02M 1/0016* (2021.05); *H02M 1/32* (2013.01)

(58) Field of Classification Search
CPC ....... H02M 3/158; H02M 1/32; H02M 1/0016
See application file for complete search history.

(56) References Cited

U.S. PATENT DOCUMENTS

2010/0057357 A1      3/2010  Miyata et al.
2019/0097277 A1*     3/2019  Fukae ..................... H02J 7/345
(Continued)

FOREIGN PATENT DOCUMENTS

JP        2012-182892 A     9/2012
JP        2018-128433 A     8/2018

OTHER PUBLICATIONS

International Search Report, Application No. PCT/JP2021/027592, mailed Oct. 5, 2021. ISA/Japan Patent Office.

*Primary Examiner* — Rafael O De Leon Domenech
(74) *Attorney, Agent, or Firm* — Brooks Kushman P.C.

(57) ABSTRACT

A power supply apparatus includes a first circuit, a second circuit, a control unit, and an anomaly determination unit. The first circuit includes a first resistor portion, and is provided in parallel to the first switching element. The second circuit is provided between a first conduction path and a second conduction path. The first circuit is configured such that a current flows from the power supply unit to the load via the first resistor portion. The second circuit is configured such that a current flows from the first conduction path to the second conduction path when in a current conduction state. The anomaly determination unit determines an anomaly based on a voltage of the first conduction path when the second circuit is in the current conduction state.

14 Claims, 9 Drawing Sheets

(56)  References Cited

U.S. PATENT DOCUMENTS

2019/0204388 A1      7/2019  Hamamoto
2019/0319539 A1 *  10/2019  Jiang ..................... H02M 3/158

* cited by examiner

FIG. 2

| Elapsed time | Remaining voltage of load |
|---|---|
| $\tau$ | 4414.6 |
| $2 \times \tau$ | 1624.0 |
| $3 \times \tau$ | 597.4 |
| $4 \times \tau$ | 219.8 |
| $5 \times \tau$ | 80.9 |
| $6 \times \tau$ | 29.7 |
| $7 \times \tau$ | 10.9 |
| $8 \times \tau$ | 4.0 |
| $9 \times \tau$ | 1.5 |
| $10 \times \tau$ | 0.5 |

POWER SUPPLY APPARATUS

CROSS-REFERENCE TO RELATED APPLICATIONS

This application is the U.S. national stage of PCT/JP2021/027592 filed on Jul. 26, 2021, the contents of which are incorporated herein.

TECHNICAL FIELD

The present disclosure relates to a power supply apparatus.

BACKGROUND

A power feeding circuit is disclosed in JP 2010-60433A. The power feeding circuit includes a semiconductor switch that is provided between a power supply and a load, and when in a normal mode, supplies a normal current to the load by controlling the semiconductor switch to be turned on, and when in a sleep mode, controls the semiconductor switch to be turned off. Moreover, the power feeding circuit includes a bypass resistor connected in parallel to the semiconductor switch, and when in a sleep mode, supplies a dark current to the load through the bypass resistor.

In the aforementioned technique, a bypass resistor is connected in parallel to a semiconductor switch, and therefore a current flows to a downstream side of the semiconductor switch regardless of the state of the semiconductor switch. Therefore, it is difficult to determine an anomaly in the semiconductor switch (e.g., a short circuit failure in which the semiconductor switch is not switched off despite being controlled to be turned off, and an open failure in which the semiconductor switch is not switched on despite being controlled to be turned on).

The present disclosure provides a technique for enabling to determine, with high accuracy, an anomaly in a switching element to which a circuit is connected in parallel.

SUMMARY

A power supply apparatus according to the present disclosure is a power supply apparatus that controls power in a power supply system including a power path that is a conduction path for supplying power from a power supply unit to a load, and a first switching element provided on the power path. The power supply apparatus includes: a first circuit that includes a first resistor portion and is provided in parallel to the first switching element; a second circuit that is provided between a first conduction path, of the power path, between the first circuit and the load, and a second conduction path, which is grounded; and an anomaly determination unit configured to determine an anomaly based on a voltage of the first conduction path. The first circuit is configured such that a current flows from the power supply unit to the load via the first resistor portion, the second circuit is configured such that a current flows from the first conduction path to the second conduction path when in a current conduction state, and the anomaly determination unit determines an anomaly based on a voltage of the first conduction path when the second circuit is in the current conduction state.

Advantageous Effects

According to the present disclosure, an anomaly in a switching element to which a circuit is connected in parallel can be determined with high accuracy.

BRIEF DESCRIPTION OF DRAWINGS

FIG. 2 is a diagram for describing a relationship between an elapsed time of discharging from a load and a remaining voltage of the load.

FIG. 10 is a circuit diagram schematically illustrating a configuration of a power supply system of an eighth embodiment.

DETAILED DESCRIPTION OF PREFERRED EMBODIMENTS

Figure 1:
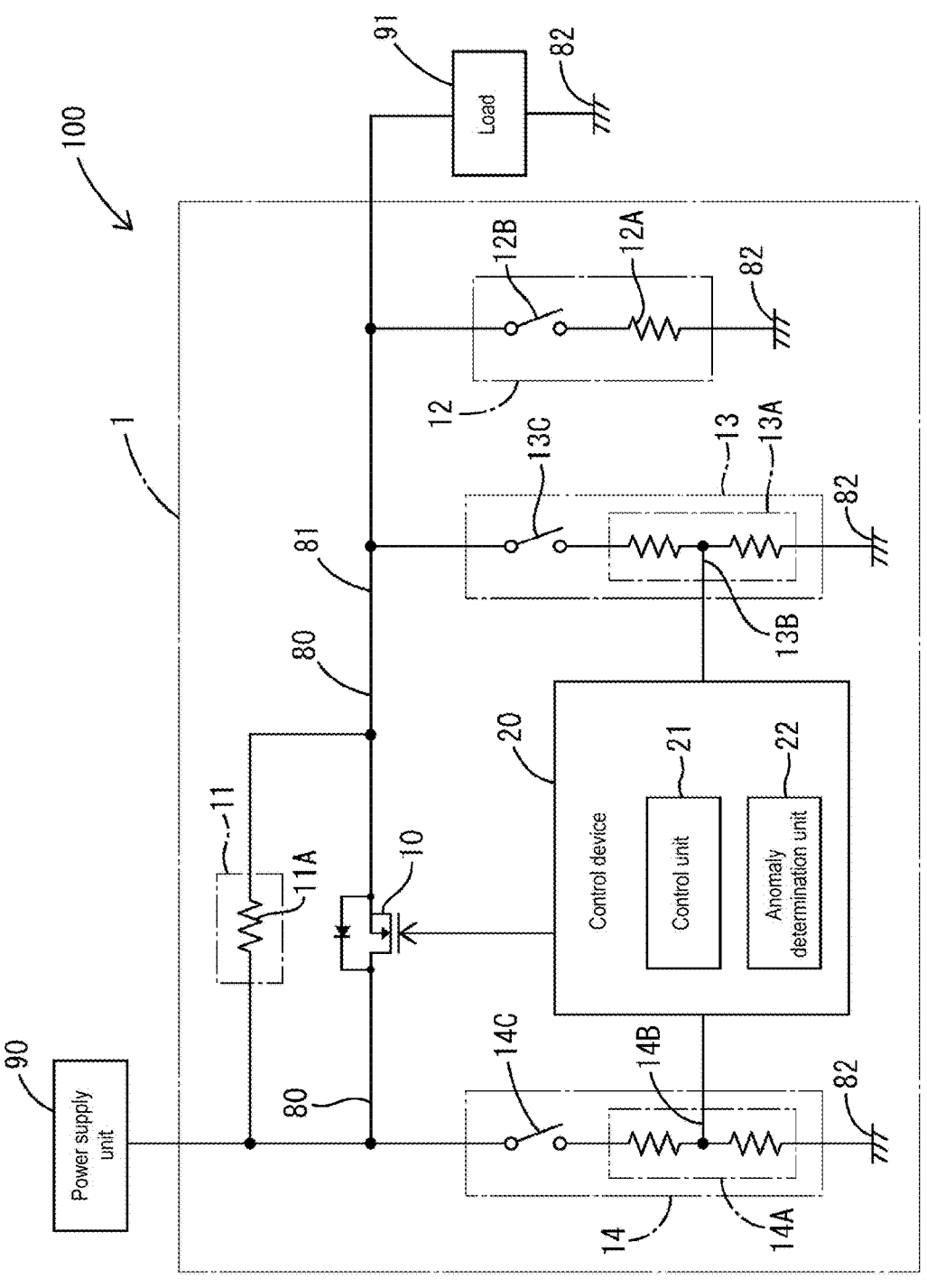
FIG. 1 is a circuit diagram schematically illustrating a configuration of a power supply system of a first embodiment.

Embodiments of the present disclosure will be enumerated and illustrated.

A power supply apparatus according to the present disclosure is a power supply apparatus that controls power in a power supply system including a power path that is a conduction path for supplying power from a power supply unit to a load, and a first switching element provided on the power path. The power supply apparatus includes: a first circuit that includes a first resistor portion and is provided in parallel to the first switching element; a second circuit that is provided between a first conduction path, of the power path, between the first circuit and the load, and a second conduction path, which is grounded; and an anomaly determination unit configured to determine an anomaly based on a voltage of the first conduction path. The first circuit is configured such that a current flows from the power supply unit to the load via the first resistor portion, the second circuit is configured such that a current flows from the first conduction path to the second conduction path when in a current conduction state, and the anomaly determination unit determines an anomaly based on a voltage of the first conduction path when the second circuit is in the current conduction state.

In this power supply apparatus, as a result of a current flowing from the first conduction path to the second conduction path via the second circuit due to the second circuit entering the current conduction state, the difference between the output potential of the power supply unit and the potential of the first conduction path can be increased. Therefore, the difference in voltage of the first conduction path increases between when the first switching element operates properly and when the first switching element does not operate properly. Therefore, the power supply apparatus determines an anomaly based on the voltage of the first conduction path when the second circuit is in the current conduction state, and as a result, an anomaly of the first switching element that is connected in parallel to the first circuit can be determined with high accuracy.

One end of the first resistor portion may be short-circuited to the power supply unit, and the other end may be short-circuited to the first conduction path.

According to this configuration, the first circuit can be continuously kept in the current conduction state without switching a switch, and therefore resetting of the load can be suppressed due to power supply to the load being stopped by switching a switch to an off state.

The first switching element may perform a normal operation such that, when in an on state, a current is allowed to flow through the power path via the first switching element, and when in an off state, a current flow through the power path via the first switching element is cut off. The power supply apparatus may further include a control unit that performs first switching control in which an instruction to enter an off state is given to the first switching element, and an instruction to enter the current conduction state is given to the second circuit. The anomaly determination unit may determine an anomaly based on a voltage of the first conduction path when the first switching control is performed.

According to this configuration, an anomaly in which the first switching element cannot be switched to an off state (so-called short circuit failure) can be determined.

The first switching element may perform a normal operation such that, when in an on state, a current is allowed to flow through the power path via the first switching element, and when in an off state, a current flow through the power path via the first switching element is cut off. The power supply apparatus may further include a control unit that performs second switching control in which an instruction to enter an on state is given to the first switching element, and an instruction to enter the current conduction state is given to the second circuit. The anomaly determination unit may determine an anomaly based on a voltage of the first conduction path when the second switching control is performed.

According to this configuration, an anomaly in which the first switching element cannot be switched to an on state (so-called open failure) can be determined.

A resistance value of the first resistor portion, a resistance value of the second circuit in the current conduction state, and a resistance value of the load in a stand-by state may be set such that a voltage obtained by voltage-dividing a voltage between output potential of the power supply unit when the first switching element is in an off state and potential of the second conduction path by the first resistor portion, the second circuit in the current conduction state, and the load in the stand-by state exceeds a lower limit voltage that is a minimum voltage needed to maintain the stand-by state of the load.

According to this configuration, an anomaly can be determined while keeping the load in the stand-by state so as to not be reset.

The power supply apparatus may include: a first voltage detection circuit configured to detect a voltage of the first conduction path; and a second voltage detection circuit configured to detect an output voltage of the power supply unit. The anomaly determination unit determines an anomaly based on a voltage of the first conduction path detected by the first voltage detection circuit and an output voltage of the power supply unit detected by the second voltage detection circuit.

According to this configuration, even in a case where the output voltage of the power supply unit may change, an anomaly can be determined while taking the influence of the change in the output voltage into consideration.

The load is a capacitive load, and a period of time in which the anomaly determination unit determines an anomaly may be larger than a time constant $\tau$ represented by a following formula (A), where a resistance value of the second circuit when in the current conduction state is denoted as R and a capacitance of the load is denoted as C.

$$\tau = R \times C \qquad \text{formula (A)}$$

According to this configuration, erroneous determination due to charge accumulation in the load can be suppressed.

A period of time in which the anomaly determination unit determines an anomaly may be three times the time constant $\tau$ or more and nine times the time constant $\tau$ or less.

As a result of setting the anomaly determination time to a period three times the time constant $\tau$ or more, the influence of discharging from the load can be reliably eliminated. Therefore, the anomaly determination unit can improve the accuracy of determining an anomaly. Meanwhile, as a result of setting the anomaly determination time to a period nine times the time constant $\tau$ or less, the anomaly determination time can be prevented from being unnecessarily long. Therefore, the anomaly determination unit can determine an anomaly in a time range appropriate for the vehicle power supply apparatus.

The anomaly determination unit may, upon determining that a vehicle starting switch is switched from an off state to an on state, determine an anomaly in a period until the load returns a start-up state from a stand-by state.

According to this configuration, an anomaly can be determined when a vehicle is started up.

The anomaly determination unit may, upon determining that a vehicle starting switch is switched from an on state to an off state, determine an anomaly after the load enters a stand-by state.

According to this configuration, an anomaly can be determined under circumstances in which the traveling of a vehicle is not influenced.

The load may output a reporting signal when switching from a start-up state to a stand-by state, and the anomaly determination unit may, upon receiving the reporting signal from the load, determine an anomaly.

According to this configuration, an anomaly is determined when a reporting signal has been received from a load, and therefore an anomaly can be reliably determined during a stand-by state.

The second circuit may include a second resistor portion and a second switching element, and the current conduction state may be an on state of the second switching element.

According to this configuration, the second circuit can be realized with a simple configuration.

The second circuit may include a first voltage detection circuit configured to detect a voltage of the first conduction path, the first voltage detection circuit may include a first voltage dividing circuit configured to detect a voltage of the first conduction path, and the first voltage-dividing circuit may be constituted by the second resistor portion.

According to this configuration, the second resistor portion can also be used as the first voltage-dividing circuit of the first voltage detection circuit.

The second circuit may include a constant current circuit, the constant current circuit may perform a constant current operation in which a constant current is caused to flow from the first conduction path to the second conduction path, and the current conduction state may be a state in which the constant current circuit performs the constant current operation.

According to this configuration, the second circuit can be switched between the current conduction state and the cut-off state using the constant current circuit.

First Embodiment

A power supply system 100 shown in FIG. 1 is a system to be mounted in a vehicle. The power supply system 100 includes a power supply unit 90, a load 91, and a power path 80, which is a conduction path through which power based on the power supply unit 90 is supplied to the load 91.

The power supply unit 90 is a battery, for example, and specifically is a lead battery, a lithium-ion battery, or the like. A terminal of the power supply unit 90 on a high potential side is electrically connected to one end of the power path 80, and a terminal of the power supply unit 90 on a low potential side is electrically connected to a second conduction path 82, which is grounded. The output voltage of the power supply unit 90 is applied to the power path 80. Note that the "voltage" in this specification is a voltage relative to a potential of the second conduction path 82.

The load 91 is an electronic device provided in a vehicle, and is an ECU (Electronic Control Unit), for example. The load 91 is switched between a start-up state and a stand-by state. The start-up state is a state in which various types of predetermined operations are executed. The stand-by state is a state in which power consumption is suppressed relative to the start-up state, and the operations that are executed in the start-up state are restricted. When the load 91 is an ECU, the stand-by state is a sleep state, for example. The sleep state is a state in which some functions are restricted, a state in which operations are performed intermittently, or the like. When a vehicle starting switch is switched to an on state, upon receiving an instruction from an external apparatus, the load 91 is switched to the start-up state, and when the starting switch is switched to an off state, upon receiving an instruction from an external apparatus, the load 91 is switched to the stand-by state. When the vehicle is an engine-mounted vehicle, the starting switch is an ignition switch, and when the vehicle is an electric car, the starting switch is a power switch. When the voltage applied to the load 91 falls below a lower limit voltage that is the minimum voltage needed to maintain the stand-by state, the load 91 is reset. The term "resetting" is in reference to erasing information stored in a volatile memory of the load 91, stopping communication between the load 91 and an external apparatus, stopping operation of the load 91, and the like. The load 91 is a capacitive load.

The power supply system 100 includes a power supply apparatus 1. The power supply apparatus 1 is an apparatus that controls electric power. The power supply apparatus 1 includes a first switching element 10, a first circuit 11, a second circuit 12, a first voltage detection circuit 13, a second voltage detection circuit 14, and a control device 20.

The first switching element 10 is a semiconductor switching element, and is a normally-off FET (Field Effect Transistor) in the present embodiment. The first switching element 10 is provided on the power path 80. The first switching element 10 performs a normal operation such that, when in an on state, current is allowed to flow through the power path 80 via the first switching element 10, and when in an off state, a current flow through the power path 80 via the first switching element 10 is cut off.

The first circuit 11 includes a first resistor portion 11A that is provided in parallel to the first switching element 10. One end of the first circuit 11 is electrically connected to a conduction path, of the power path 80, on the power supply unit 90 side relative to the first switching element 10, and the other end of the first circuit 11 is electrically connected to a conduction path, of the power path 80, on the load 91 side relative to the first switching element 10. The first circuit 11 is configured such that a current flows from the power supply unit 90 to the load 91 through the first resistor portion 11A. One end of the first resistor portion 11A is short-circuited to the power supply unit 90, and the other end is short-circuited to a first conduction path 81. The first conduction path 81 is a conduction path, of the power path 80, between the first circuit 11 (specifically, a connection point between the other end of the first circuit 11 and the power path 80) and the load 91. The first resistor portion 11A is a structure in which a plurality of resistors are connected in series. One end of this structure is the one end of the first resistor portion 11A, and the other end is the other end of the first resistor portion 11A.

The second circuit 12 is provided between the first conduction path 81 and a second conduction path 82. One end of the second circuit 12 is electrically connected to the first conduction path 81, and the other end is electrically connected to the second conduction path 82. The second circuit 12 is switchable between a current conduction state in which a current flows from the first conduction path 81 to the second conduction path 82 through the second circuit 12, and a cut-off state in which a current flow from the first conduction path 81 to the second conduction path 82 through the second circuit 12 is cut off. The second circuit 12 is configured such that, when in the current conduction state, a current flows from the first conduction path 81 to the second conduction path 82. The second circuit 12 includes a second resistor portion 12A and a second switching element 12B. The second resistor portion 12A and the second switching element 12B are connected in series to each other. The second resistor portion 12A is a structure in which a plurality of resistors are connected in series. The current conduction state is an on state of the second switching element 12B, and the cut-off state is an off state of the second switching element 12B. The second circuit 12 is configured such that, when the second switching element 12B is in an on state, a current flows from the first conduction path 81 to the second conduction path 82.

The resistance value of the first resistor portion 11A, the resistance value of the second circuit 12 in the current conduction state (in the present embodiment, the resistance value of the second resistor portion 12A), and the resistance value of the load 91 in the stand-by state are set such that the voltage obtained by voltage-dividing the voltage between an output potential of the power supply unit 90 when the first switching element 10 is in an off state and a potential of the second conduction path 82 by the first resistor portion 11A, the second circuit 12 in the current conduction state (in the present embodiment, the second resistor portion 12A), and the load 91 in the stand-by state exceeds the lower limit voltage that is the minimum voltage needed to maintain a stand-by state of the load 91.

The first voltage detection circuit 13 is a circuit that detects the voltage of the first conduction path 81. The first voltage detection circuit 13 includes a first voltage-dividing circuit 13A, a first output circuit 13B, and a third switching element 13C. The first voltage-dividing circuit 13A detects and voltage-divides the voltage of the first conduction path 81. The first output circuit 13B outputs the voltage obtained by voltage-dividing performed by the first voltage-dividing circuit 13A. The third switching element 13C, when in an on state, allows a current to flow from the first conduction path 81 to the first voltage-dividing circuit 13A, and when in an off state, cuts off a current flow from the first conduction path 81 to the first voltage-dividing circuit 13A. That is, when the third switching element 13C is in an on state, the first voltage detection circuit 13 detects the voltage of the first conduction path 81, voltage-divides the detected voltage, and outputs the divided voltage. Also, a signal indicating the voltage of the first conduction path 81 that is output from the first voltage detection circuit 13 is input to the control device 20.

The second voltage detection circuit 14 is a circuit that detects the output voltage of the power supply unit 90. The second voltage detection circuit 14 is connected to a conduction path, of the power path 80, on the power supply unit 90 side relative to the first switching element 10. The second voltage detection circuit 14 includes a second voltage-dividing circuit 14A, a second output circuit 14B, and a fourth switching element 14C. The second voltage-dividing circuit 14A detects and voltage-divides the output voltage of the power supply unit 90. The second output circuit 14B outputs the voltage obtained by voltage dividing performed by the second voltage-dividing circuit 14A. The fourth switching element 14C, when in an on state, allows a current to flow from the power supply unit 90 to the second voltage-dividing circuit 14A, and when in an off state, cuts off a current flow from the power supply unit 90 to the second voltage-dividing circuit 14A. That is, when the fourth switching element 14C is in an on state, the second voltage detection circuit 14 detects the output voltage of the power supply unit 90, voltage-divides the detected voltage, and outputs the divided voltage. Also, the signal indicating the output voltage of the power supply unit 90 that is output from the second voltage detection circuit 14 is input to the control device 20.

The control device 20 controls the power supply apparatus 1. The control device 20 is an ECU (Electronic Control Unit), for example, and includes a CPU, a memory, an AD converter, a driving circuit, and the like. The control device 20 specifies the voltage of the first conduction path 81 based on the signal output from the first voltage detection circuit 13. The control device 20 specifies the output voltage of the power supply unit 90 based on the signal output from the second voltage detection circuit 14. The control device 20 includes a control unit 21 and an anomaly determination unit 22.

The control unit 21 switches the second circuit 12 between the current conduction state and the cut-off state. The control unit 21 controls the first switching element 10, the second switching element 12B, the third switching element 13C, and the fourth switching element 14C. The control unit 21 performs first switching control in which an instruction to enter an off state is given to the first switching element 10, and an instruction to enter an on state is given to the second switching element 12B. Either one of the instruction given to the first switching element 10 to enter an off state and the instruction given to the second switching element 12B to enter an on state may be given first, or both of the instructions may be given at the same time.

The anomaly determination unit 22 determines an anomaly based on the voltage of the first conduction path 81. Here, the anomaly refers to a short circuit failure in which the first switching element 10 is not switched to an off state properly. The anomaly determination unit 22 determines an anomaly based on the voltage of the first conduction path 81 when the second switching element 12B is in an on state. Specifically, the anomaly determination unit 22 determines an anomaly based on the voltage of the first conduction path 81 when the first switching control is performed. The anomaly determination unit 22 determines whether or not the voltage of the first conduction path 81 is larger than a threshold voltage, and determines that there is an anomaly if the determination is affirmative.

The anomaly determination unit 22 determines an anomaly based on the voltage of the first conduction path 81 detected by the first voltage detection circuit 13 and the output voltage of the power supply unit 90 detected by the second voltage detection circuit 14. When the output voltage of the power supply unit 90 is not continuously constant, the anomaly determination accuracy can be improved by determining an anomaly by referring to the output voltage of the power supply unit 90 detected by the second voltage detection circuit 14. In the present embodiment, the threshold voltage is corrected based on the output voltage of the power supply unit 90 detected by the second voltage detection circuit 14, and an anomaly is determined based on the corrected threshold voltage. The corrected threshold voltage is obtained by the following formulas (1) and (2), for example.

$$Vth2 = CR \times Vth1 \qquad \text{formula (1)}$$

Vth2 is a corrected threshold voltage. Vth1 is a predetermined threshold voltage, and is a threshold voltage corresponding to a reference value (e.g., output voltage of the battery when fully charged) of the output voltage of the power supply unit 90.

$$CR = VB2/VB1 \qquad \text{formula (2)}$$

CR is a change rate of the output voltage of the power supply unit 90. VB1 is the reference value of the output voltage of the power supply unit 90. VB2 is an output voltage of the power supply unit 90 detected by the second voltage detection circuit 14.

The predetermined threshold voltage (uncorrected threshold voltage) is set so as to be larger than the voltage of the first conduction path 81 when the first switching element 10 has properly entered an off state, and smaller than the voltage of the first conduction path 81 when the first switching element 10 has not properly entered an off state.

The anomaly determination time during which the anomaly determination unit 22 determines an anomaly is set in advance. The anomaly determination time is set to a time period longer than the time constant τ represented by the following formula (A), where the resistance value of the second circuit 12 in the current conduction state (in the present embodiment, resistance value of the second resistor portion 12A) is denoted as R, and the capacitance of the load 91 is denoted as C.

$$\tau = R \times C \qquad \text{formula (A)}$$

FIG. 2 shows a relationship, when the load 91 is discharged after the charged voltage of the load 91 has reached the output voltage of the fully charged power supply unit 90

(12V in the present embodiment), between an elapsed time of discharging and the remaining voltage of the load 91. The remaining voltage of the load 91 is an error factor of the voltage of the first conduction path 81. As is apparent from FIG. 2, it is preferable that the anomaly determination time is three times the time constant τ or more and nine times the time constant τ or less. As a result of setting the anomaly determination time to three times the time constant τ or more, the influence of discharging from the load 91 can be reliably eliminated. Therefore, the anomaly determination unit 22 can improve the anomaly determination accuracy. On the other hand, as a result of setting the anomaly determination time to nine times the time constant τ or less, the anomaly determination time can be prevented from being unnecessarily long. Therefore, the anomaly determination unit 22 can determine an anomaly in a time range appropriate for a power supply apparatus of a vehicle.

Upon determining that the vehicle starting switch has been switched from an off state to an on state, the anomaly determination unit 22 determines an anomaly in a period in which the load 91 returns from the stand-by state to the start-up state. A signal indicating whether the starting switch is in an on state or an off state is input to the control device 20 from an external apparatus. The anomaly determination unit 22 determines whether the starting switch is in an on state or an off state based on this signal. Upon determining that the starting switch has switched to an on state, the anomaly determination unit 22 immediately determines an anomaly, and as a result, an anomaly can be determined in a period in which the load 91 returns from the stand-by state to the start-up state.

The following description relates to an operation performed by the control device 20. When the vehicle starting switch has entered an off state, the control device 20 executes the processing shown in FIG. 3. First, in step S10, the control device 20 determines whether or not the vehicle starting switch has been switched from an off state to an on state. Upon determining that the starting switch has not been switched to an on state (No in step S10), the control device 20 returns the processing to step S10. That is, the control device 20 repeats step S10 until it is determined that the starting switch has switched to an on state.

Upon determining that the starting switch has been switched to an on state (Yes in step S10), the control device 20 performs the aforementioned first switching control in step S11. Accordingly, the first switching element 10 is caused to enter an off state if it is properly operating, and the second switching element 12B is caused to enter an on state.

In step S12, the control device 20 specifies the output voltage of the power supply unit 90, and corrects the threshold voltage following the aforementioned formulas (1) and (2), in step S13. Also, the control device 20 starts a timer in step S14, and specifies the voltage of the first conduction path 81 in step S15. Then, in step S16, the control device 20 determines whether or not the voltage of the first conduction path 81 specified in step S15 is larger than the threshold voltage corrected in step S13.

Upon determining that the voltage of the first conduction path 81 is not larger than the threshold voltage (No in step S16), in step S17, the control device 20 determines whether or not the elapsed timer operating time has exceeded a preset anomaly determination time. Upon determining that the anomaly determination time has not elapsed (No in step S17), the control device 20 returns the processing to step S15. That is, the control device 20 repeats the processing in which the voltage of the first conduction path 81 is specified, and whether or not the specified voltage of the first conduction path 81 is larger than the threshold voltage is determined, until the control device 20 determines that the voltage of the first conduction path 81 is larger than the threshold voltage or determines that the anomaly determination time has elapsed.

Figure 3:
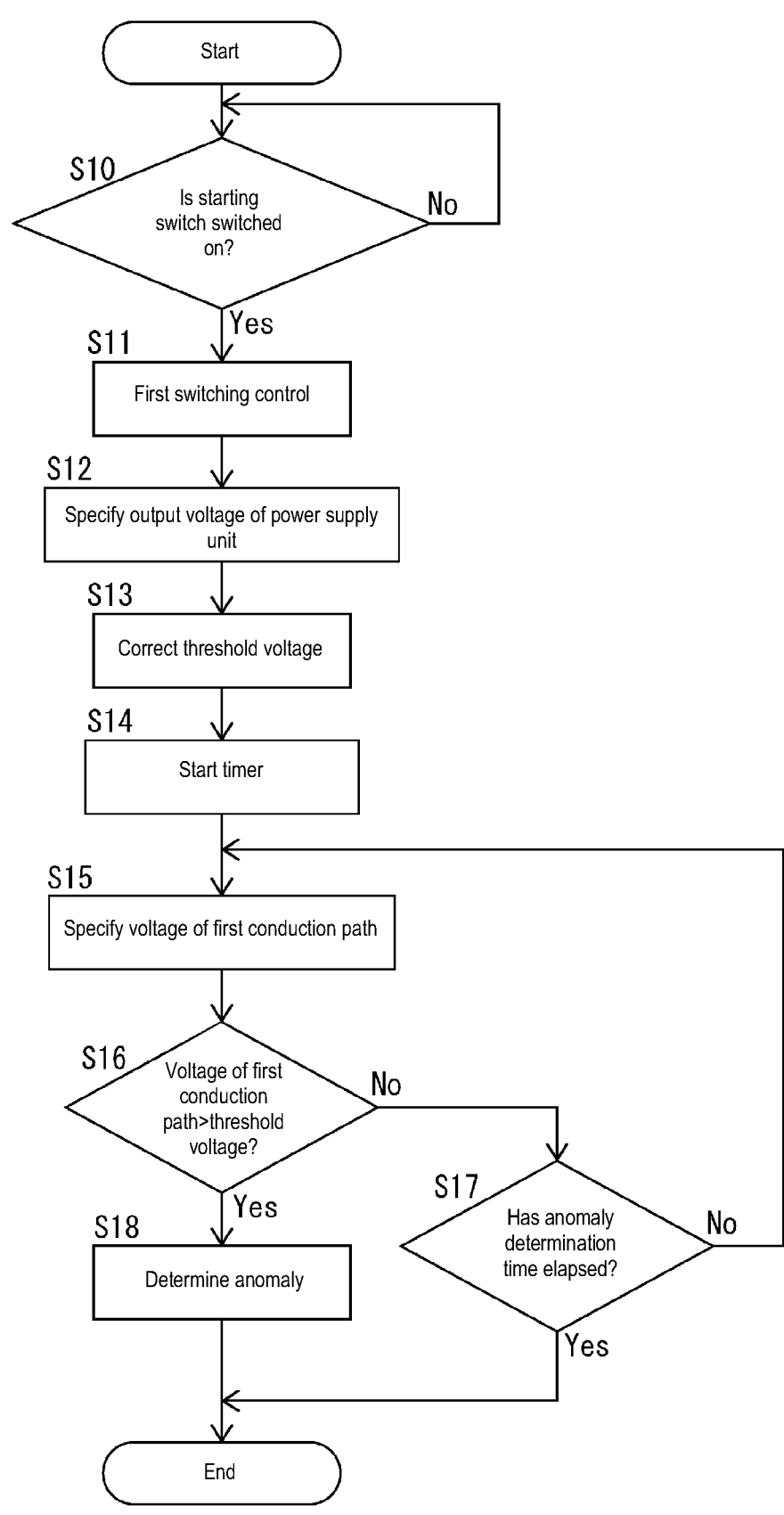
FIG. 3 is a flowchart illustrating an operation flow of a control device in the first embodiment.

Upon determining that the voltage of the first conduction path 81 is larger than the threshold voltage (Yes in step S16), in step S18, the control device 20 determines that there is an anomaly, and ends the processing in FIG. 3. If the anomaly determination time has elapsed without a determination that the voltage of the first conduction path 81 is larger than the threshold voltage being made (Yes in step S17), the control device 20 ends the processing in FIG. 3.

The following description relates to effects.

The power supply apparatus 1 of the first embodiment includes the first resistor portion 11A, and includes the first circuit 11 provided in parallel to the first switching element 10. Therefore, without giving an instruction to the first switching element 10 to enter an on state, a dark current can be supplied to the load 91 through the first circuit 11. However, in the configuration in which the first circuit 11 is included, a current is routed to the downstream side of the first switching element 10 through the first circuit 11 regardless of whether or not the first switching element 10 has properly entered an off state, and therefore it is difficult to determine an anomaly in which the first switching element 10 has not properly switched to an off state. However, the power supply apparatus 1 includes the second circuit 12 that includes the second resistor portion 12A and the second switching element 12B, and is provided between the first conduction path 81, of the power path 80, between the first circuit 11 and the load 91 and the second conduction path 82, which is grounded. The second circuit 12 is configured such that a current flows from the first conduction path 81 to the second conduction path 82 when the second switching element 12B is in an on state. That is, the power supply apparatus 1 can increase the difference between the output potential of the power supply unit 90 and the potential of the first conduction path 81 by causing a current to flow from the first conduction path 81 to the second conduction path 82 through the second circuit 12 while the second switching element 12B is in an on state. Therefore, the difference in voltage, of the first conduction path 81, between when the first switching element 10 is properly caused to enter an off state and when the first switching element 10 is not properly caused to enter an off state increases. Therefore, as a result of determining an anomaly based on the voltage of the first conduction path 81 when the second switching element 12B is in an on state, the power supply apparatus 1 can determine an anomaly in the first switching element 10 that is connected in parallel to the first circuit 11 with high accuracy.

Also, the one end of the first resistor portion 11A is short-circuited to the power supply unit 90, and the other end is short-circuited to the first conduction path 81. Therefore, the power supply apparatus 1 can cause the first circuit 11 to be in the current conduction state without switching a switch, and therefore a case can be suppressed where power supply to the load 91 is stopped by switching a switch off, and the load 91 is reset.

Also, the first switching element 10 performs a normal operation such that, when in an on state, allows a current to flow through the power path 80 via the first switching element 10, and when in an off state, cuts off a current flow to the power path 80 via the first switching element 10. The control unit 21 performs the first switching control in which an instruction to enter an off state is given to the first switching element 10, and an instruction to enter an on state is given to the second switching element 12B. The anomaly determination unit 22 determines an anomaly based on the voltage of the first conduction path 81 when the first switching control is performed. Therefore, an anomaly in which the first switching element 10 is not switched to an off state can be reliably determined.

Also, the resistance value of the first resistor portion 11A, the resistance value of the second resistor portion 12A, and the resistance value of the load 91 in the stand-by state are set such that the voltage obtained by voltage-dividing the voltage between an output potential of the power supply unit 90 when the first switching element 10 is in an off state and a potential of the second conduction path 82 by the first resistor portion 11A, the second resistor portion 12A, and the load 91 in the stand-by state exceeds the lower limit voltage that is the minimum voltage needed to maintain the stand-by state of the load 91. Therefore, an anomaly can be determined while keeping the load 91 in a stand-by state so as to not be reset.

Also, the anomaly determination unit 22 determines an anomaly based on the voltage of the first conduction path 81 detected by the first voltage detection circuit 13 and the output voltage of the power supply unit 90 detected by the second voltage detection circuit 14. Specifically, the anomaly determination unit 22 corrects the threshold voltage based on the output voltage of the power supply unit 90 detected by the second voltage detection circuit 14, and determines that there is an anomaly if the voltage of the first conduction path 81 detected by the first voltage detection circuit 13 is larger than the corrected threshold voltage. According to this configuration, even in a case where the output voltage of the power supply unit 90 may change, an anomaly can be determined while taking the influence of the change in the output voltage into consideration.

Also, the load 91 is a capacitive load, and the time period during which the anomaly determination unit 22 determines an anomaly is longer than the time constant τ represented by the aforementioned formula (A). Therefore, erroneous determination caused by charges accumulated in the load 91 can be suppressed.

Also, upon determining that a vehicle starting switch has switched from an off state to an on state, the anomaly determination unit 22 determines an anomaly in a period in which the load 91 returns to a start-up state from a stand-by state, and therefore an anomaly can be determined under circumstances in which the traveling of a vehicle is not influenced.

Second Embodiment

In a second embodiment, an example in which the second resistor portion 12A described in the first embodiment also functions as the first voltage-dividing circuit 13A will be described. Note that the second embodiment differs from the first embodiment in that the second resistor portion also functions as the first voltage-dividing circuit, and the other configurations are the same as those of the first embodiment. The constituent elements that are the same as those of the first embodiment are given the same reference numerals, and the detailed description thereof will be omitted.

Figure 4:
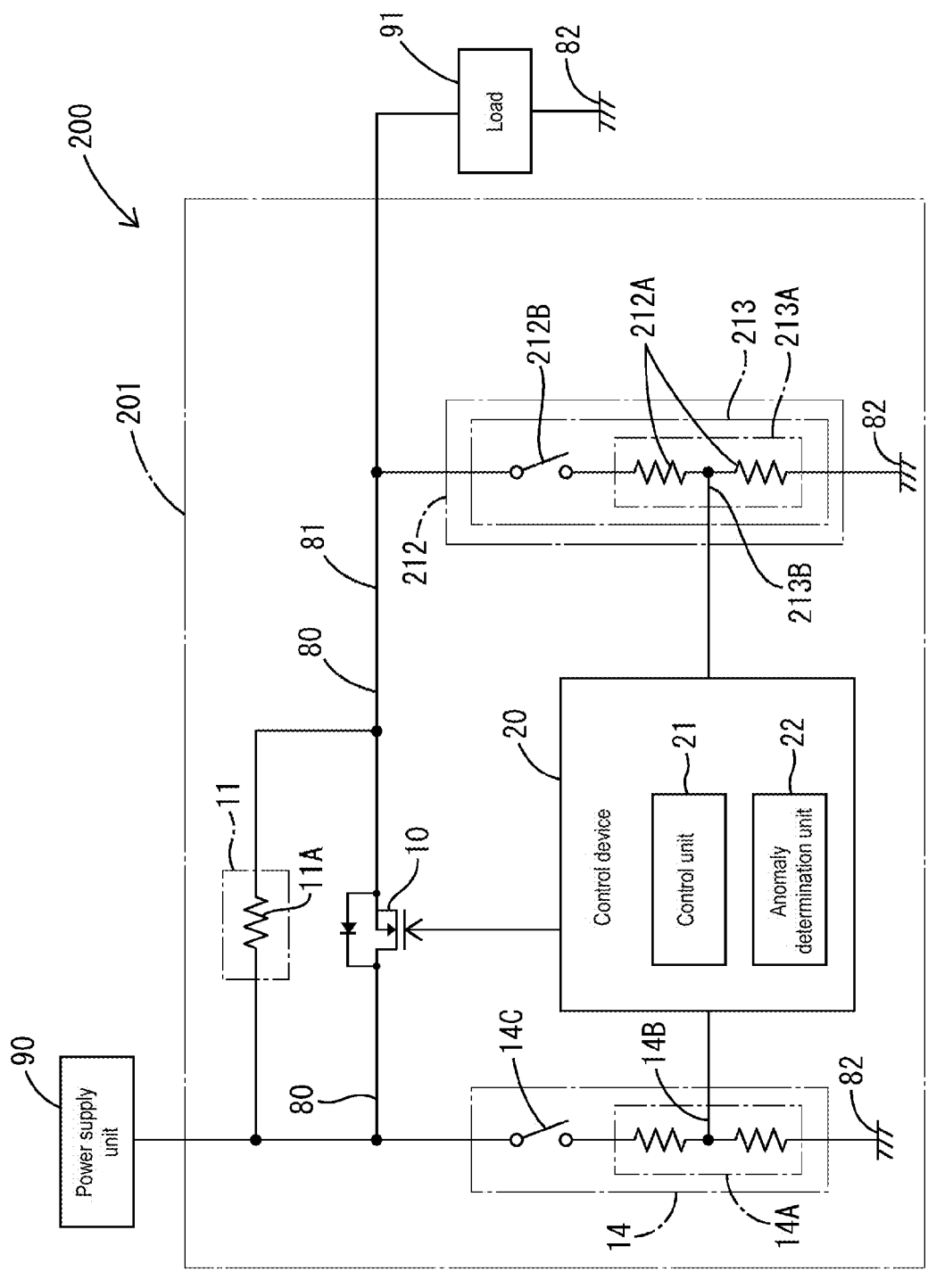
FIG. 4 is a circuit diagram schematically illustrating a configuration of a power supply system of a second embodiment.

A power supply apparatus 201 of the second embodiment shown in FIG. 4 is an apparatus that controls electric power in a power supply system 200. The power supply apparatus 201 includes a second circuit 212. The second circuit 212 is provided between a first conduction path 81 and a second conduction path 82. One end of the second circuit 212 is electrically connected to the first conduction path 81, and the other end is electrically connected to the second conduction path 82.

The second circuit 212 includes a first voltage detection circuit 213. The first voltage detection circuit 213 is a circuit that detects the voltage of the first conduction path 81. The first voltage detection circuit 213 includes a first voltage-dividing circuit 213A, a first output circuit 213B, and a second switching element 212B. The first voltage-dividing circuit 213A includes a second resistor portion 212A, and is constituted by the second resistor portion 212A. That is, the second circuit 212 includes the second resistor portion 212A and the second switching element 212B. The second resistor portion 212A and the second switching element 212B are connected in series to each other. The second circuit 212 is configured such that when the second switching element 212B is in an on state, a current flows from the first conduction path 81 to the second conduction path 82.

The first voltage-dividing circuit 213A detects and voltage-divides the voltage of the first conduction path 81. The first output circuit 213B outputs a voltage obtained by voltage-dividing performed by the first voltage-dividing circuit 213A. The second switching element 212B, when in an on state, allows a current to flow from the first conduction path 81 to the first voltage-dividing circuit 213A, and when in an off state, cuts off a current flow from the first conduction path 81 to the first voltage-dividing circuit 213A. That is, when the second switching element 212B is in an on state, the first voltage detection circuit 213 detects the voltage of the first conduction path 81, voltage-divides the detected voltage, and outputs the divided voltage. Also, a signal indicating the voltage of the first conduction path 81 that is output from the first voltage detection circuit 213 is input to the control device 20.

As described above, in the power supply apparatus 201 of the second embodiment, the first voltage-dividing circuit 213A is constituted by the second resistor portion 212A. Therefore, the second resistor portion 212A can also be used as the first voltage-dividing circuit 213A of the first voltage detection circuit 213.

Third Embodiment

In a third embodiment, a case will be described in which "upon determining that a vehicle starting switch has been switched from an on state to an off state, an anomaly determination unit determines an anomaly after a load has entered a stand-by state". Note that the third embodiment has the same configuration as the first embodiment except the operation in which "upon determining that a vehicle starting switch has been switched from an on state to an off state, an anomaly determination unit determines an anomaly after a load has entered a stand-by state". The third embodiment will be described with reference to FIG. 1 illustrating the configuration of the power supply system of the first embodiment.

Upon determining that a vehicle starting switch has been switched from an on state to an off state, an anomaly determination unit 22 determines an anomaly after a load 91 has entered a stand-by state. The method of determining whether or not the load 91 has switched to the stand-by state is not specifically limited, and determination may also be made based on an elapsed time from when the vehicle starting switch was determined to have switched to an off state, for example.

The following description relates to an operation performed by a control device 20 of the third embodiment.

Figure 5:
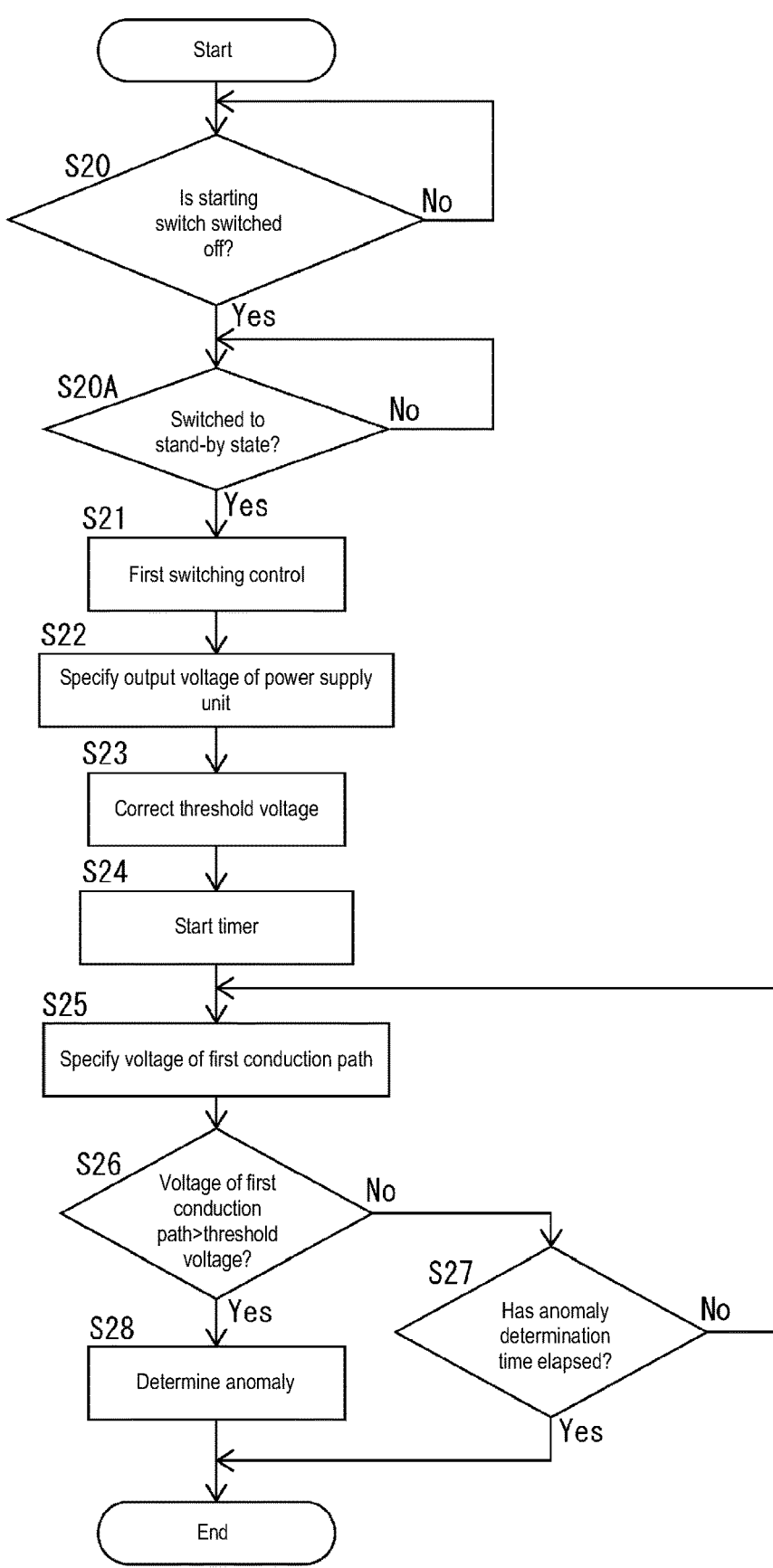
FIG. 5 is a flowchart illustrating an operation flow of a control device in a third embodiment.

When a vehicle starting switch has entered an on state, the control device 20 executes the processing in FIG. 5. The control device 20, first, in step S20, determines whether or not the vehicle starting switch has been switched from an on state to an off state. Upon determining that the starting switch has not been switched to an off state (No in step S20), the control device 20 returns the processing to step S20. That is, the control device 20 repeats step S20 until it is determined that the starting switch has switched to an off state.

Upon determining that the starting switch is switched to an off state (Yes in step S20), the control device 20 determines whether or not the load 91 has switched to the stand-by state (step S20A). Upon determining that the load 91 has not switched to the stand-by state (No in step S20A), the control device 20 returns the processing to step S20A, and repeats step S20A until it is determined that the load 91 has switched to the stand-by state. Upon determining that the load 91 has switched to the stand-by state (Yes in step S20A), the control device 20 performs processing in steps S21 to S28. The processing in steps S21 to S28 is the same as the processing in steps S11 to S18 in the first embodiment, and therefore the detailed description thereof will be omitted.

As described above, in the power supply apparatus 1 of the third embodiment, upon determining that the vehicle starting switch has been switched from an on state to an off state, the anomaly determination unit 22 determines an anomaly after the load 91 has entered the stand-by state. Therefore, according to the power supply apparatus 1, an anomaly can be determined under circumstances in which the traveling of a vehicle is not influenced.

Fourth Embodiment

In a fourth embodiment, an example will be described in which the control device 20 described in the first embodiment is enabled to communicate with the load 91, and upon receiving a reporting signal indicating that the load 91 has switched to the stand-by state from the load 91, the control device 20 determines an anomaly. Note that the fourth embodiment differs from the first embodiment in that an anomaly is determined when a reporting signal is received from the load 91, and other configurations are the same as those of the first embodiment. Note that the configurations of the power supply system of the fourth embodiment are the same as those of the first embodiment except that the control device 20 can communicate with the load 91, and therefore the fourth embodiment will be described with reference to FIG. 1 illustrating the configuration of the power supply system of the first embodiment.

The control device 20 can communicate with the load 91. When a starting switch is switched to an off state, the load 91 is switched from a start-up state to a stand-by state in response to an external instruction. Upon being switched from the start-up state to the stand-by state, the load 91 outputs a reporting signal for reporting this fact. The reporting signal is input to the control device 20. Upon receiving the reporting signal from the load 91, an anomaly determination unit 22 of the control device 20 determines an anomaly.

Figure 6:
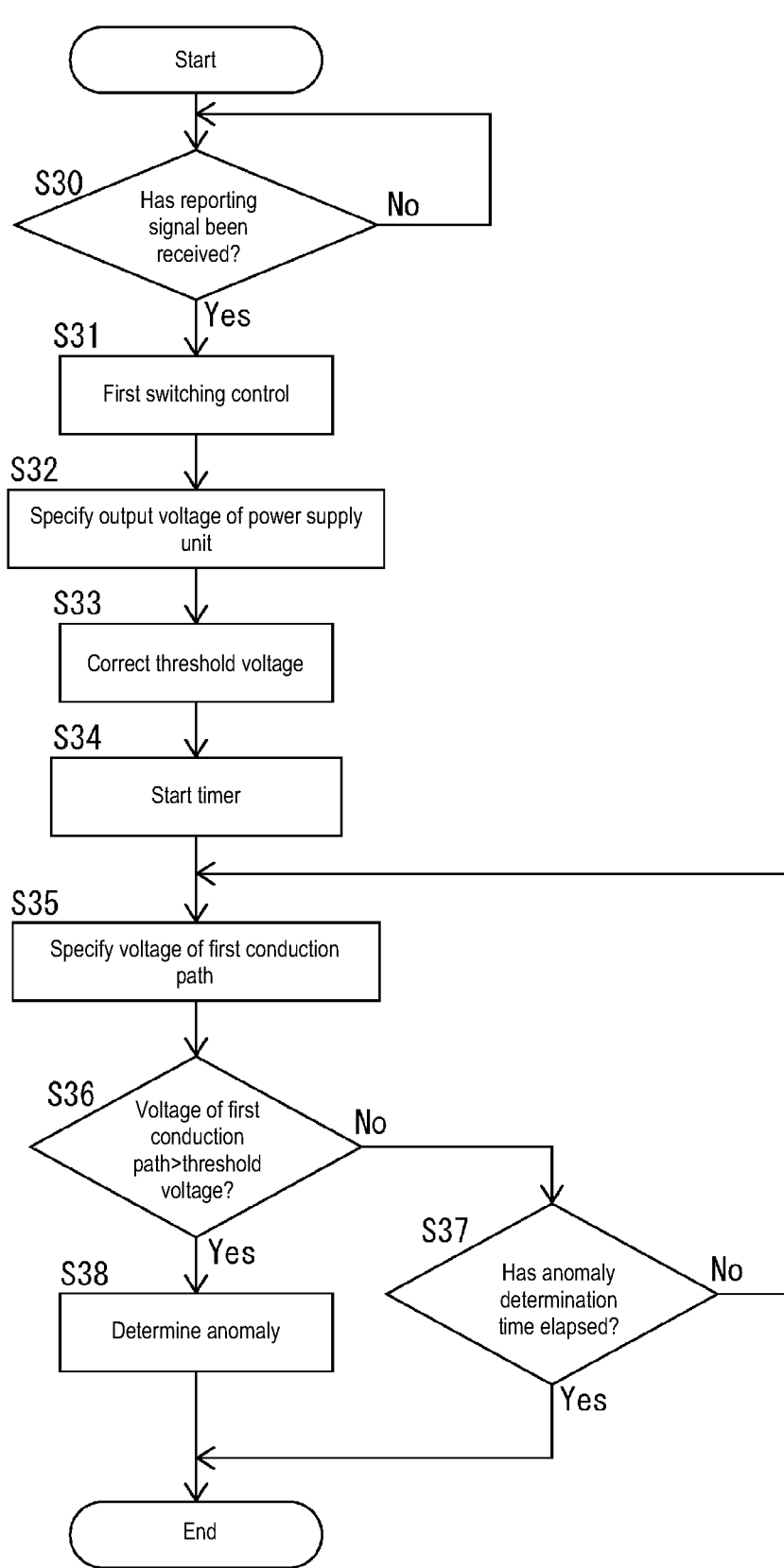
FIG. 6 is a flowchart illustrating an operation flow of a control device in a fourth embodiment.

The following description relates to operations performed by the control device 20 of the fourth embodiment. When the vehicle starting switch has entered an on state, the control device 20 executes the processing shown in FIG. 6. First, in step S30, the control device 20 determines whether or not a reporting signal has been received from the load 91. Upon determining that a reporting signal has not been received (No in step S30), the control device 20 returns the processing to step S30. That is, the control device 20 repeats step S30 until it is determined that a reporting signal has been received. Upon determining that a reporting signal has been received (Yes in step S30), the control device 20 performs the processing in steps S31 to S38. The processing in steps S31 to S38 is the same as the processing in steps S11 to S18 in the first embodiment, and therefore the detailed description thereof will be omitted.

As described above, in the power supply apparatus 1 of the fourth embodiment, upon receiving a reporting signal from the load 91, the anomaly determination unit 22 determines an anomaly. Therefore, according to this configuration, an anomaly can be reliably determined during a stand-by state.

Fifth Embodiment

The first, third, and fourth embodiments are configured so as to determine a short circuit failure of the first switching element. In contrast, the fifth embodiment is configured to determine an open failure of the first switching element. The fifth embodiment differs from the first embodiment only in terms of the control method performed by the control device 20. In the following description, the constituent elements that are the same as those of the first embodiment are given the same reference numerals, and detailed description thereof will be omitted.

The control unit 21 performs second switching control in which an instruction to enter an on state is given to a first switching element 10, and an instruction to enter a current conduction state is given to a second circuit 12. An anomaly determination unit 22 determines an anomaly based on the voltage of the first conduction path 81 when the second switching control is performed. Here, the anomaly refers to an open failure in which the first switching element 10 is not properly switched to an on state. The anomaly determination unit 22 determines whether or not the voltage of the first conduction path 81 is smaller than a threshold voltage, and determines that there is an anomaly if the voltage is smaller than the threshold voltage.

The predetermined threshold voltage (uncorrected threshold voltage) is set so as to be smaller than the voltage of the first conduction path 81 when the first switching element 10 has properly entered an on state, and larger than the voltage of the first conduction path 81 when the first switching element 10 has not properly entered an on state. Similarly to the first embodiment, the anomaly determination unit 22 corrects the threshold voltage.

The following description relates to operations performed by the control device 20 of the fifth embodiment. When a vehicle starting switch has entered an off state, the control device 20 executes the processing shown in FIG. 7. First, in step S50, the control device 20 determines whether or not the vehicle starting switch has been switched from an off state to an on state. Upon determining that the starting switch has not been switched to an on state (No in step S50), the control device 20 returns the processing to step S50. That is, the control device 20 repeats step S50 until it is determined that the starting switch has been switched to an on state.

Upon determining that the starting switch has been switched to an on state (Yes in step S50), the control device 20 performs the aforementioned second switching control in step S51. Accordingly, the first switching element 10 is caused to enter an on state, if it is normal, and the second switching element 12B is caused to enter an on state.

The control device 20 specifies the output voltage of a power supply unit 90 in step S52, and in step S53, corrects the threshold voltage using the formulas (1) and (2) described in the first embodiment. Also, the control device 20 starts operation of a timer in step S54, and in step S55, specifies the voltage of the first conduction path 81. Then, in step S56, the control device 20 determines whether or not the voltage of the first conduction path 81 specified in step S55 is smaller than the threshold voltage corrected in step S53.

Upon determining that the voltage of the first conduction path 81 is not smaller than the threshold voltage (No in step S56), in step S57, the control device 20 determines whether or not the elapsed timer operation time has exceeded an anomaly determination time. Upon determining that the anomaly determination time has not elapsed (No in step S57), the control device 20 returns the processing to step S55. That is, the control device 20 repeats the processing in which the voltage of the first conduction path 81 is specified, and whether or not the specified voltage of the first conduction path 81 is smaller than the threshold voltage is determined until it is determined that the voltage of the first conduction path 81 is smaller than the threshold voltage or it is determined that the anomaly determination time has elapsed.

Figure 7:
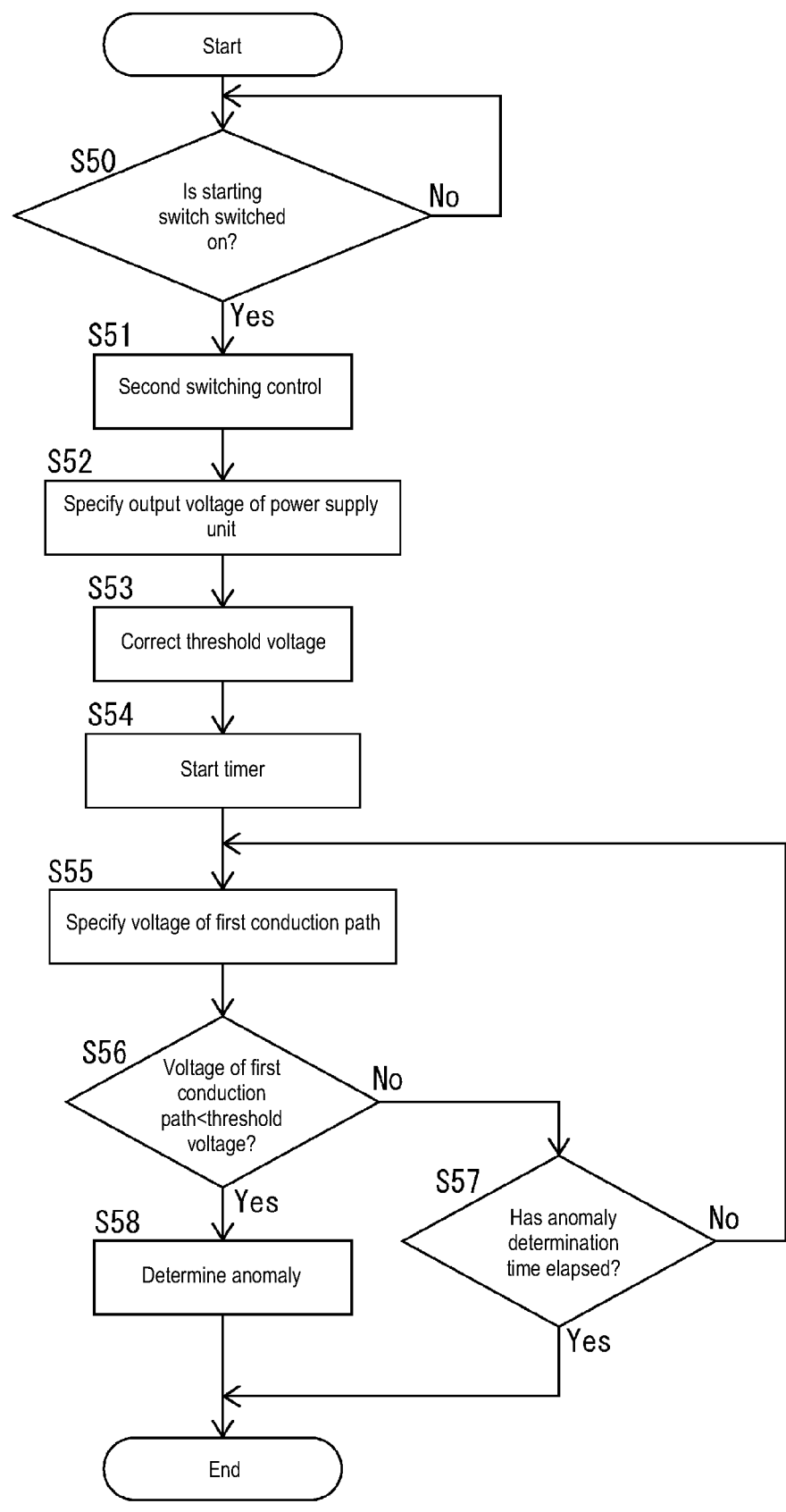
FIG. 7 is a flowchart illustrating an operation flow of a control device in a fifth embodiment.

Upon determining that the voltage of the first conduction path 81 is smaller than the threshold voltage (Yes in step S56), in step S58, the control device 20 determines that there is an anomaly, and ends the processing in FIG. 7. If the anomaly determination time has elapsed without a determination that the voltage of the first conduction path 81 is smaller than the threshold voltage being made (Yes in step S57), the control device 20 ends the processing in FIG. 7.

As described above, according to the power supply apparatus 1 of the fifth embodiment, an open failure of the first switching element 10 connected in parallel to the first circuit 11 can be determined.

Sixth Embodiment

The power supply apparatus 1 of the fifth embodiment is configured such that "the anomaly determination unit, upon determining that the vehicle starting switch has been switched from an off state to an on state, determines an anomaly during a period until the load switches from the stand-by state to the start-up state". In contrast, a power supply apparatus 1 of the sixth embodiment is configured such that "the anomaly determination unit, upon determining that the vehicle starting switch has been switched from an on state to an off state, determines an anomaly after the load enters the stand-by state". The sixth embodiment differs from the fifth embodiment only in terms of the timing at which an anomaly is determined. In the following description, differences from the fifth embodiment will be mainly described, and the description of common portions will be omitted.

Upon determining that a vehicle starting switch has been switched from an on state to an off state, an anomaly determination unit 22 determines an anomaly after a load 91 enters a stand-by state. The method of determining whether or not the load 91 has switched to the stand-by state is not specifically limited, and determination may also be made based on an elapsed time from when the vehicle starting switch was determined to have switched to an off state, for example.

Figure 8:
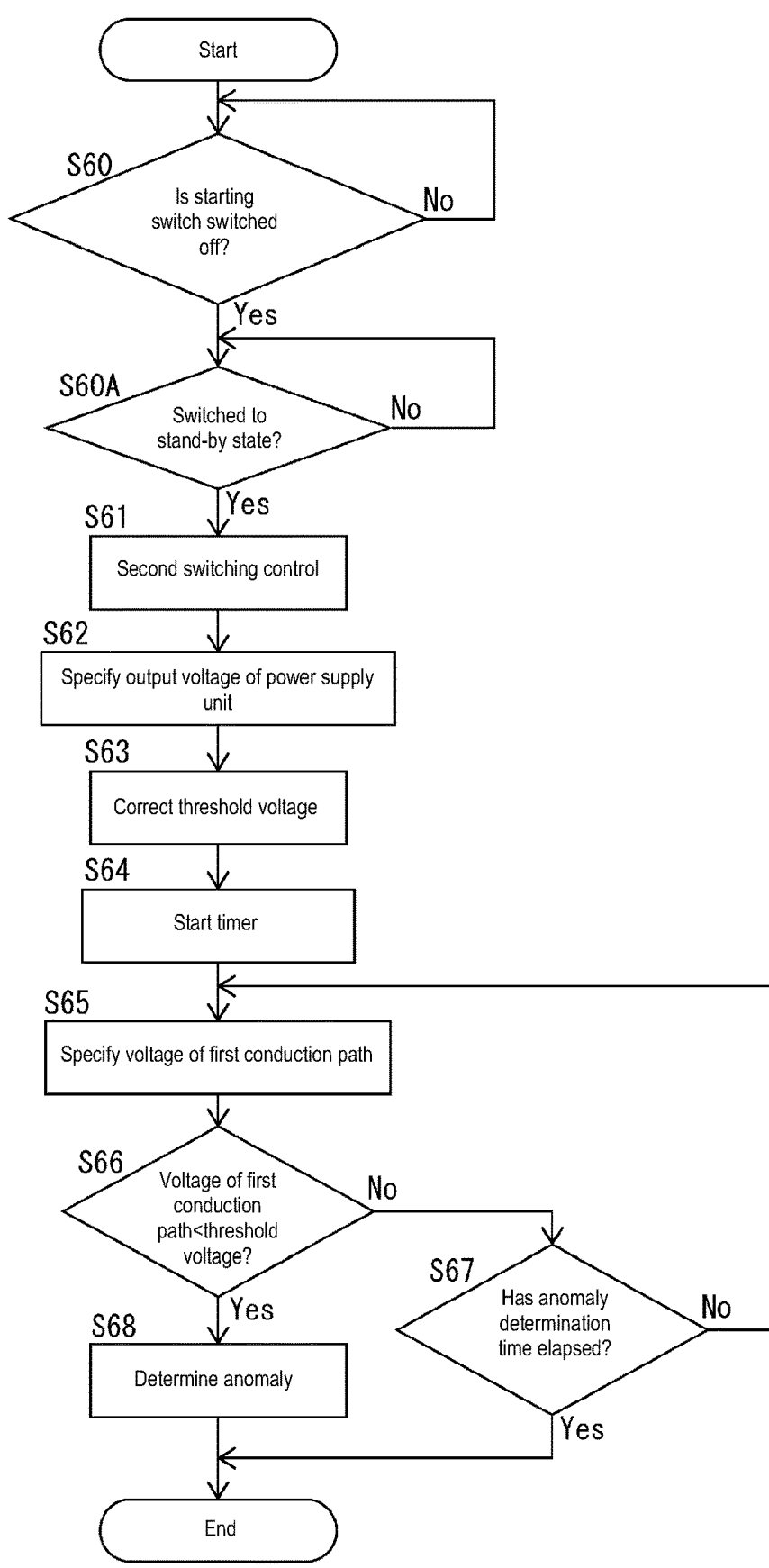
FIG. 8 is a flowchart illustrating an operation flow of a control device in a sixth embodiment.

The following description relates to operations performed by the control device 20 of the sixth embodiment. When the vehicle starting switch has entered an on state, the control device 20 executes the processing shown in FIG. 8. First, in step S60, the control device 20 determines whether or not the vehicle starting switch has been switched from an on state to an off state. Upon determining that the starting switch has not been switched to an off state (No in step S60), the control device 20 returns the processing to step S60. That is, the control device 20 repeats step S60 until it is determined that the starting switch has been switched to an off state.

Upon determining that the starting switch has been switched to an off state (Yes in step S60), the control device 20 determines whether or not the load 91 has switched to the stand-by state (step S60A). Upon determining that the load 91 has not switched to the stand-by state (No in step S60A), the control device 20 returns the processing to step S60A and repeats step S60A until it is determined that the load 91 has switched to the stand-by state. Upon determining that the load 91 has switched to the stand-by state (Yes in step S60A), the control device 20 performs the processing in steps S61 to S68. The processing in steps S61 to S68 is the same as the processing in steps S51 to S58 in the fifth embodiment, and therefore detailed description thereof will be omitted.

As described above, in the power supply apparatus 1 of the sixth embodiment, upon determining that the vehicle starting switch has been switched from an on state to an off state, the anomaly determination unit 22 determines an anomaly after the load 91 has entered a stand-by state. Therefore, according to the power supply apparatus 1, an anomaly can be determined under circumstances in which traveling of the vehicle is not influenced.

Seventh Embodiment

The power supply apparatus 1 of the fifth embodiment is configured such that "the anomaly determination unit, upon determining that the vehicle starting switch has been switched from an off state to an on state, determines an anomaly during a period until the load switches from a stand-up state to a start-up state". In contrast, a power supply apparatus 1 of the seventh embodiment is configured such that "upon receiving a reporting signal from a load, an anomaly determination unit determines an anomaly". The seventh embodiment differs from the fifth embodiment only in terms of the timing at which an anomaly is determined. In the following description, differences from the fifth embodiment will be mainly described, and the description of common portions will be omitted.

A control device 20 can communicate with a load 91. When a starting switch is switched to an off state, the load 91 switches from a start-up state to a stand-by state in response to an external instruction. Upon being switched from the start-up state to the stand-by state, the load 91 outputs a reporting signal reporting the fact of switching. The reporting signal is input to the control device 20. Upon receiving the reporting signal from the load 91, an anomaly determination unit 22 of the control device 20 determines an anomaly.

Figure 9:
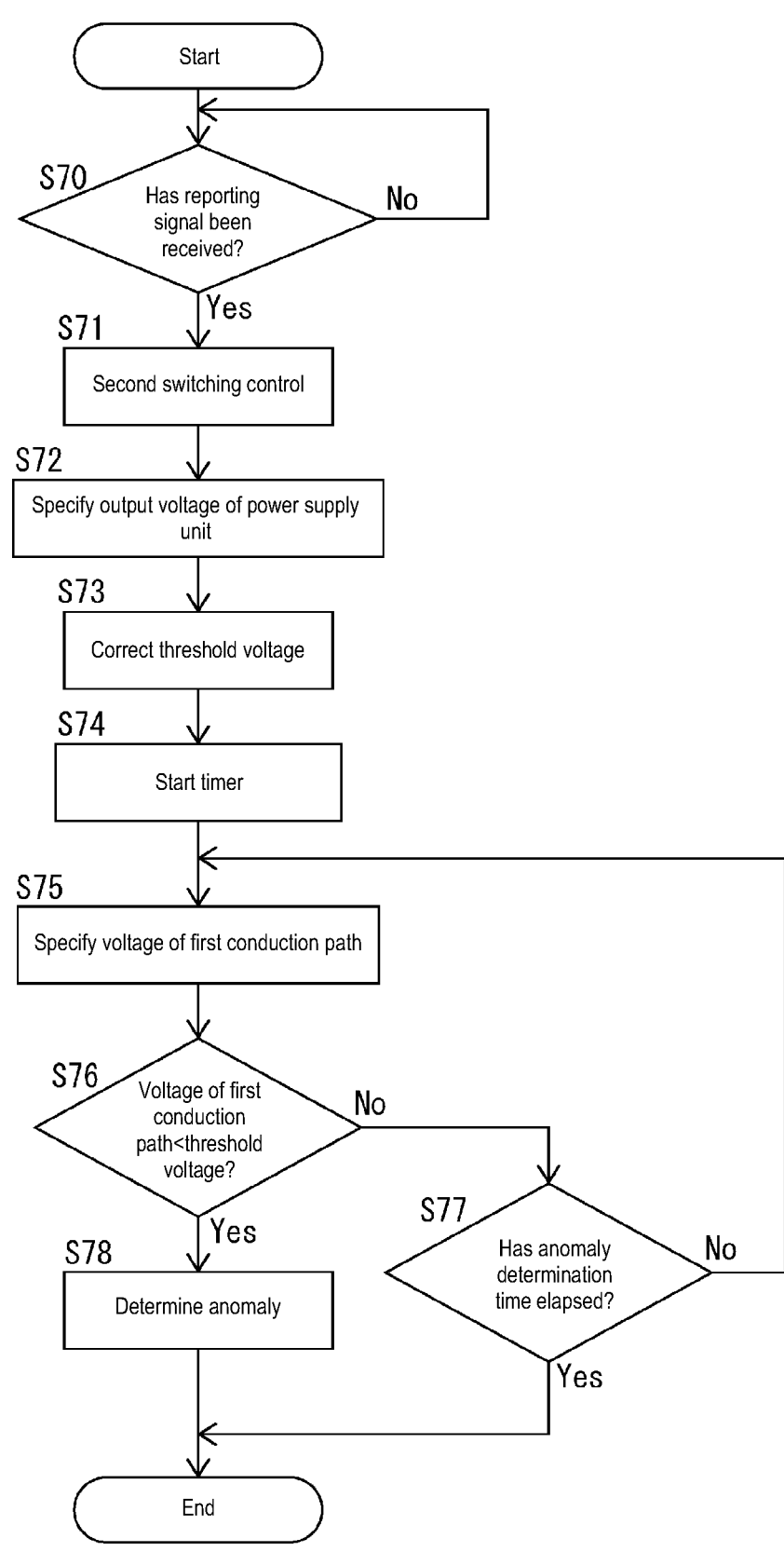
FIG. 9 is a flowchart illustrating an operation flow of a control device in a seventh embodiment.

The following description relates to operations performed by the control device 20 of the seventh embodiment. When the vehicle starting switch has entered an on state, the control device 20 executes the processing shown in FIG. 9. First, in step S70, the control device 20 determines whether or not a reporting signal has been received from the load 91. Upon determining that a reporting signal has not been received (No in step S70), the control device 20 returns the processing to step S70. That is, the control device 20 repeats step S70 until a reporting signal is determined to have been received.

Upon determining that a reporting signal has been received (Yes in step S70), the control device 20 performs the processing in steps S71 to S78. The processing in steps S71 to S78 is the same as the processing in steps S51 to S58 in the fifth embodiment, and therefore detailed description thereof will be omitted.

As described above, in the power supply apparatus 1 of the seventh embodiment, upon receiving a reporting signal from the load 91, the anomaly determination unit 22 determines an anomaly. Therefore, according to the power supply apparatus 1, an anomaly can be determined after the load 91 has reliably entered a stand-by state.

Eighth Embodiment

A power supply apparatus 801 of an eighth embodiment differs from the power supply apparatus 1 of the first embodiment in that a second circuit 12 includes a constant current circuit instead of the second resistor portion. In the following description, the constituent elements that are the same as those of the first embodiment are given the same reference numerals, and detailed description thereof will be omitted.

A power supply system 800 of the eighth embodiment includes a power supply apparatus 801. The power supply apparatus 801 includes a second circuit 812. The second circuit 812 includes a constant current circuit 812A and a second switching element 12B. The constant current circuit 812A is provided between a first conduction path 81 and a second conduction path 82. The constant current circuit 812A performs a constant current operation in which a constant current is caused to flow from the first conduction path 81 to the second conduction path 82. The constant current circuit 812A and the second switching element 12B are connected in series between the first conduction path 81 and the second conduction path 82. The second switching element 12B is PWM-controlled by the control device 20. The current value of a constant current that is caused to flow by the constant current circuit 812A is adjusted by the duty ratio (ratio of on time in one period) of a PWM signal that is applied to the second switching element 12B. The state in which the constant current circuit 812A performs a constant current operation is a current conduction state, and the state in which the constant current circuit 812A does not perform the constant current operation is a cut-off state. That is, the state in which the second switching element 12B is PWM controlled is the current conduction state, and the state in which the second switching element 12B is kept in an off state is the cut-off state. Note that, in this specification, when the current value is not specifically limited, the constant current operation refers to an operation in which a constant current of a predetermined reference current value is caused to flow.

The resistance value of a second resistor portion 12A, the resistance value of the constant current circuit 812A when performing the constant current operation, and the resistance value of the load 91 in a stand-by state are set such that the voltage obtained by voltage-dividing the voltage between the output potential of the power supply unit 90 when the first switching element 10 is in an off state and the potential of the second conduction path 82 by the second resistor portion 12A, the constant current circuit 812A when performing the constant current operation, and the load 91 in the stand-by state exceeds the lower limit voltage that is the minimum voltage needed to maintain the stand-by state of the load 91.

The anomaly determination time in which the anomaly determination unit 22 determines an anomaly is determined using the aforementioned formula (A). R is the resistance value of the constant current circuit 812A when performing the constant current operation. Note that the current value in the constant current operation when specifying the resistance value R may be the aforementioned reference current value, may also be an envisioned lower limit current value, may also be an envisioned upper limit current value, or may also be another current value.

As described above, according to the power supply apparatus 801 of the eighth embodiment, the second circuit 12 can be switched between the current conduction state and the cut-off state by using the constant current circuit 812A.

OTHER EMBODIMENTS

The present disclosure is not limited to the embodiments illustrated by the above description and drawings. For example, the features of the embodiments described above and below can be combined as long as no contradiction arises. Also, any feature of the embodiments described above and below may be omitted provided they are not explicitly indicated as being essential. Furthermore, the embodiments described above may be modified as follows.

In the embodiments described above, as the method of "determining an anomaly based on the voltage of the first conduction path detected by the first voltage detection circuit and the output voltage of the power supply unit detected by the second voltage detection circuit", a method has been described in which the threshold voltage is corrected based on the output voltage of the power supply unit 90 detected by the second voltage detection circuit 14, and an anomaly is determined based on the corrected threshold voltage, but another method may also be adopted. For example, the anomaly determination unit 22 may correct the voltage of the first conduction path 81 detected by the first voltage detection circuit 13 based on the output voltage of the power supply unit 90 detected by the second voltage detection circuit 14, and determine an anomaly based on the corrected voltage of the first conduction path 81. As the method of correcting the voltage of the first conduction path 81, the voltage of the first conduction path 81 may be corrected by multiplying the voltage of the first conduction path 81 detected by the first voltage detection circuit 13 by the change rate CR of the output voltage of the power supply unit 90, for example.

In the embodiments described above, a configuration has been adopted in which an anomaly is determined based on the voltage of the first conduction path 81 detected by the first voltage detection circuit 13 and the output voltage of the power supply unit 90 detected by the second voltage detection circuit 14, but a configuration may also be adopted in which an anomaly is determined based only on the voltage of the first conduction path 81 detected by the first voltage detection circuit 13. That is, the threshold voltage and the voltage of the first conduction path 81 need not be corrected.

In the embodiments described above, a configuration has been adopted in which the first circuit 11 does not include a switch, but a configuration may also be adopted in which the first circuit 11 includes a switch.

In the first, third, and fourth embodiments, a configuration was adopted in which an anomaly is determined if it is determined that the voltage of the first conduction path exceeds a threshold voltage in a period starting from when the first switching control is started to when the anomaly determination time elapses, but another configuration may also be adopted. For example, a configuration may also be adopted in which an anomaly is determined if it is not determined that the voltage of the first conduction path is a threshold voltage or less in a period starting from when the first switching control is started to when the anomaly determination time elapses. Alternatively, an anomaly may also be determined based on the voltage of the first conduction path at a time when the anomaly determination time has elapsed since the first switching control was started. Specifically, an anomaly is determined if the voltage of the first conduction path at a time when the anomaly determination time has elapsed from when the first switching control was started is larger than a threshold voltage.

In the fifth, sixth, and seventh embodiments described above, a configuration was adopted in which an anomaly is determined if it is determined that the voltage of the first conduction path falls below a threshold voltage in a period starting from when the second switching control is started to when the anomaly determination time elapses, but another configuration may also be adopted. For example, a configuration may also be adopted in which an anomaly is determined if it is not determined that the voltage of the first conduction path is a threshold voltage or more in a period starting from when the second switching control is started to when the anomaly determination time elapses. Alternatively, an anomaly may also be determined based on the voltage of the first conduction path at a time when the anomaly determination time has elapsed since the second switching control was started. Specifically, an anomaly is determined if the voltage of the first conduction path at a time when the anomaly determination time has elapsed from when the second switching control was started is smaller than a threshold voltage.

In the embodiments described above, a configuration has been adopted in which only one of determination of a short circuit failure and determination of an open failure is performed, but a configuration may also be adopted in which both types of failures are determined. When both types of failures are determined, a configuration may also be adopted in which after one of the failures is determined, the other of the failures is determined, for example.

It should be noted that the embodiments disclosed herein should be considered as examples in all respects and not restrictive. The scope of the present disclosure is not limited to the embodiments disclosed herein, and is intended to include all modifications within the scope indicated by the claims or within a scope equivalent to the claims.

The invention claimed is:

1. A power supply apparatus that controls power in a power supply system including a power path that is a conduction path for supplying power from a power supply unit to a load, and a first switching element provided on the power path, the power supply apparatus comprising:

a first circuit that includes a first resistor portion and is provided in parallel to the first switching element;

a second circuit having a second switching element, the second circuit provided between a first conduction path, of the power path, between the first circuit and the load, and a second conduction path, which is grounded; and an anomaly determination unit configured to determine an anomaly based on a voltage of the first conduction path, wherein the first circuit is configured such that a current flows from the power supply unit to the load via the first resistor portion, the second circuit is configured such that a current flows from the first conduction path to the second conduction path when in a current conduction state, and the anomaly determination unit determines an anomaly based on a voltage of the first conduction path when the second switching element is on.

2. The power supply apparatus according to claim 1, wherein one end of the first resistor portion is short-circuited to the power supply unit, and the other end is short-circuited to the first conduction path.

3. The power supply apparatus according to claim 1, wherein the first switching element performs a normal operation such that, when in an on state, a current is allowed to flow through the power path via the first switching element, and when in an off state, a current flow through the power path via the first switching element is cut off, the power supply apparatus further comprises a control unit that performs first switching control in which an instruction to enter an off state is given to the first switching element, and an instruction to enter the current conduction state is given to the second circuit, and the anomaly determination unit determines an anomaly based on a voltage of the first conduction path when the first switching control is performed.

4. The power supply apparatus according to claim 1, wherein the first switching element performs a normal operation such that, when in an on state, a current is allowed to flow through the power path via the first switching element, and when in an off state, a current flow through the power path via the first switching element is cut off, the power supply apparatus further comprises a control unit that performs second switching control in which an instruction to enter an on state is given to the first switching element, and an instruction to enter the current conduction state is given to the second circuit, and the anomaly determination unit determines an anomaly based on a voltage of the first conduction path when the second switching control is performed.

5. The power supply apparatus according to claim 1, wherein a resistance value of the first resistor portion, a resistance value of the second circuit in the current conduction state, and a resistance value of the load in a stand-by state are set such that a voltage obtained by voltage-dividing a voltage between an output potential of the power supply unit when the first switching element is in an off state and a potential of the second conduction path by the first resistor portion, the second circuit in the current conduction state, and the load in the stand-by state exceeds a lower limit voltage that is a minimum voltage needed to maintain the stand-by state of the load.

6. The power supply apparatus according to claim 1, further including;

a first voltage detection circuit configured to detect a voltage of the first conduction path; and a second voltage detection circuit configured to detect an output voltage of the power supply unit, wherein the anomaly determination unit determines an anomaly based on a voltage of the first conduction path detected by the first voltage detection circuit and an output voltage of the power supply unit detected by the second voltage detection circuit.

7. The power supply apparatus according to claim 1, wherein the load is a capacitive load, a period of time in which the anomaly determination unit determines an anomaly is larger than a time constant τ represented by a following formula (A), where a resistance value of the second circuit in the current conduction state is denoted as R and a capacitance of the load is denoted as C.

$$\tau = R \times C \qquad \text{formula (A)}$$

8. The power supply apparatus according to claim 7, wherein a period of time in which the anomaly determination unit determines an anomaly is three times the time constant τ or more and nine times the time constant τ or less.

9. The power supply apparatus according to claim 1, wherein upon determining that a vehicle starting switch is switched from an off state to an on state, the anomaly determination unit determines an anomaly in a period in which the load returns a start-up state from a stand-by state.

10. The power supply apparatus according to claim 1, wherein, upon determining that a vehicle starting switch is switched from an on state to an off state, the anomaly determination unit determines an anomaly after the load enters a stand-by state.

11. The power supply apparatus according to claim 1, wherein the load outputs a reporting signal upon switching from a start-up state to a stand-by state, and the anomaly determination unit, upon receiving the reporting signal from the load, determines an anomaly.

12. The power supply apparatus according to claim 1, wherein the second circuit further includes a second resistor portion, and the current conduction state is an on state of the second switching element.

13. The power supply apparatus according to claim 12, wherein the second circuit includes a first voltage detection circuit configured to detect a voltage of the first conduction path, the first voltage detection circuit includes a first voltage-dividing circuit configured to detect a voltage of the first conduction path, and the first voltage-dividing circuit is constituted by the second resistor portion.

14. The power supply apparatus according to claim 1, wherein the second circuit includes a constant current circuit, the constant current circuit performs a constant current operation in which a constant current is caused to flow from the first conduction path to the second conduction path, and the current conduction state is a state in which the constant current circuit performs the constant current operation.

* * * * *